Oct. 1, 1957 A. W. HAM 2,808,465

RECORDING, REPRODUCTION AND TRANSMISSION SYSTEMS

Filed Jan. 27, 1954 3 Sheets-Sheet 1

INVENTOR.
Albert W. Ham
BY Edwin Levisohn &
Harry Cole
ATTORNEYS

Oct. 1, 1957 A. W. HAM 2,808,465

RECORDING, REPRODUCTION AND TRANSMISSION SYSTEMS

Filed Jan. 27, 1954 3 Sheets-Sheet 2

INVENTOR.

Albert W. Ham

BY Edwin Levisohn + Harry Cole

ATTORNEYS

RECORDING, REPRODUCTION AND TRANSMISSION SYSTEMS

Filed Jan. 27, 1954 3 Sheets-Sheet 3

INVENTOR.
Albert W. Ham
BY Edwin Levisohn & Harry Cohn
ATTORNEYS

United States Patent Office 2,808,465

Patented Oct. 1, 1957

2,808,465

RECORDING, REPRODUCTION AND TRANSMISSION SYSTEMS

Albert W. Ham, New York, N. Y.

Application January 27, 1954, Serial No. 406,437

9 Claims. (Cl. 179—100.1)

The present invention relates generally to recording, reproduction and transmission systems.

In the reproduction of sound by a loud speaker, whether the loud speaker is incorporated in a radio or television receiver, in a record playback apparatus, or in a public address system, and whether the sound originates with a live or a recorded source, variations in the sound intensity level at the sound source will result in variations in the intensity levels of the signal voltages in the sound transmission and/or reproducing systems which, unless compensated for, will result in variations in the intensity of the sound level at the loud speaker. For example, while the average voice has an intensity range of 40 db many professional singers have even a wider intensity range. It has been found that audience reaction to either the reproduction or broadcast of a recording, as well as to a live broadcast, is much greater where the intensity level is kept constant since an audience actually hears easier and better and actually comprehends better under constant intensity level conditions.

Therefore, the primary object of the present invention is the provision of means for recording, transmitting or broadcasting at a constant signal intensity level.

By definition, sound level is taken as the reading of a sound level meter with the appropriate weighting network in the electrical circuit of the amplifier in the transmission or reproducing system and it is known practice to determine sound level readings through the use of a volume unit meter, also known in the art as a VU Meter. Such a meter is used to determine the maximum non-distortion sound level voltage, which is arbitrarily set as a zero unit reading or a 100 percent voltage reading on the meter, any reading above zero units or 100 percent voltage indicating the presence of distortion sound level voltage. In attempting to compensate for the described variations in the intensity level at the loud speaker for the purpose of eliminating peak level distortion, it is a known practice for an audio engineer, during the making of a recording or a live or recorded broadcast, to watch the readings on the VU Meter and to manually operate the gain controls in the audio amplifiers to decrease the gain with an increase in the sound intensity and, conversely, to decrease the gain with a increase in sound intensity. This is known in the art as "riding" the sound level signal voltage and has proven to be quite unsatisfactory since the engineer must be able to anticipate each variation in the intensity level of a live voice or musical instrument output and make the corresponding correction in the gain of the amplifier at the very same moment that the signal of varied intensity is being amplified by the amplifier. Therefore, another object of the present invention, is the provision of a system for automatically and efficiently eliminating peak signal level distortion.

Another object is the provision of a highly novel and simplified means for delaying or storing signal voltages.

A further object is the provision of a highly novel method for recording, reproducing and transmitting signals at a constant signal voltage level.

The above and other objects, features and advantages of the present invention will be more fully understood from the following description considered in connection with the accompanying illustrative drawings.

In the drawings which illustrate the best mode presently contemplated by me of carrying out my invention.

Fig. 1 more-or-less diagrammatically illustrates an apparatus pursuant to the present invention;

Figures 1, 4, 7:
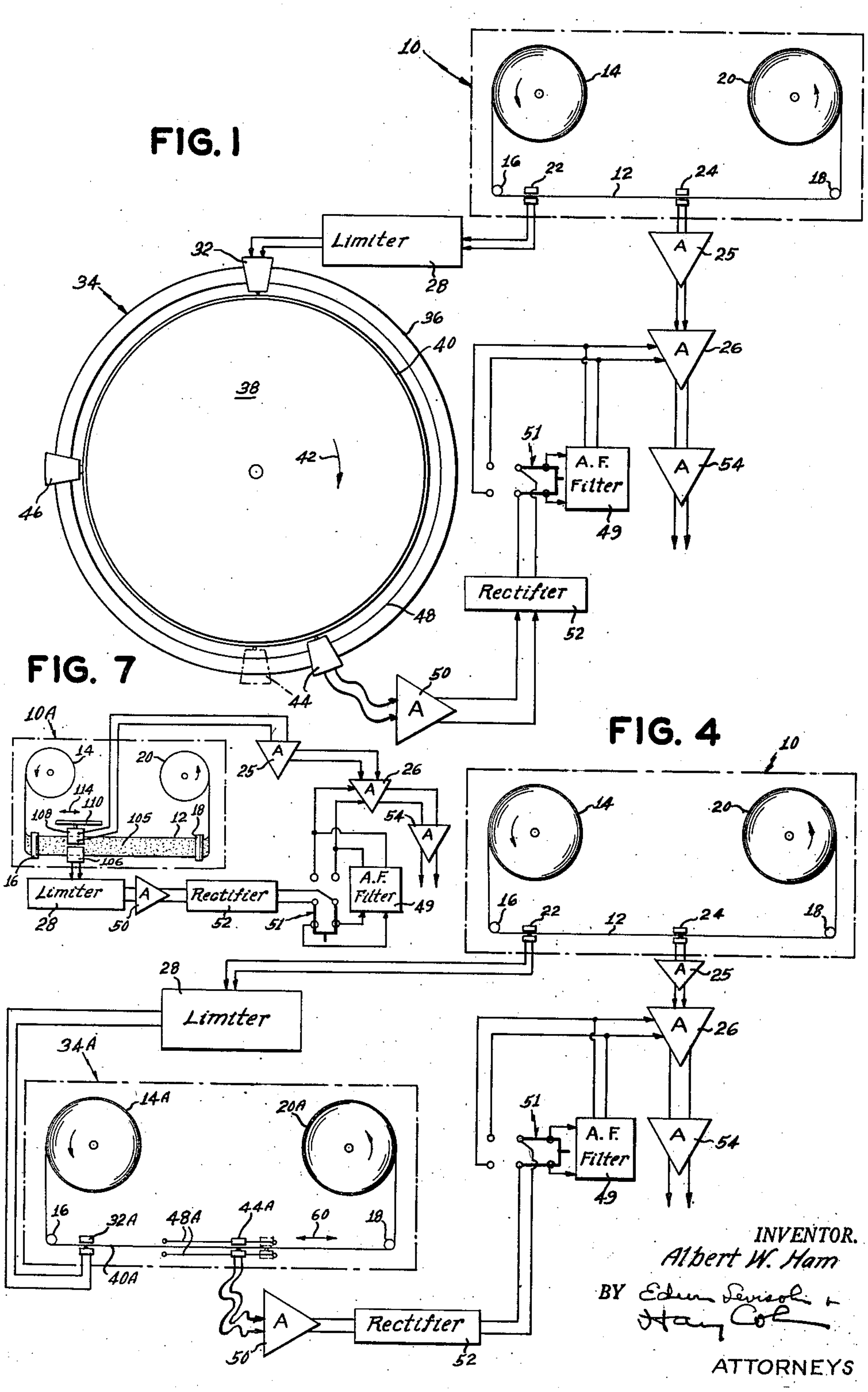
Fig. 4 illustrates a modification of the apparatus of Fig. 1.
Fig. 7 illustrates a further embodiment of the present invention.
Figure 2:
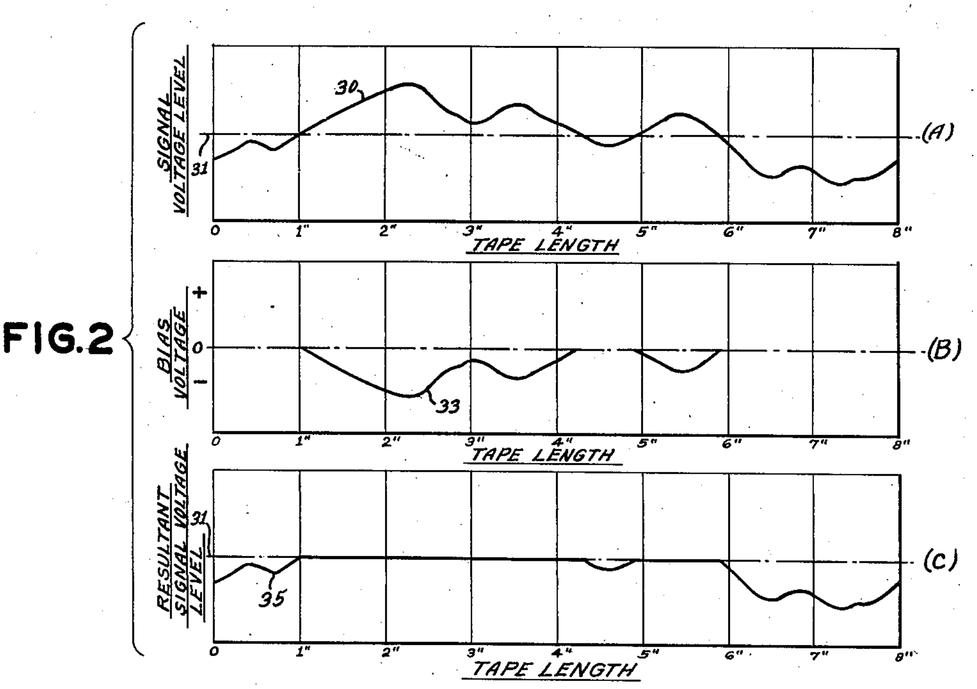
Fig. 2 illustrates graphs of voltage levels at various parts of the apparatus of Fig. 1 when operated to eliminate peak signal distortion.

Referring now to Fig. 1 of the drawings in detail, there is illustrated, more-or-less diagrammatically and schematically, apparatus pursuant to the present invention. The reference numeral 10 illustrates a conventional magnetic tape playback apparatus, in which a magnetic tape 12 which has a suitable sound recording thereon, travels from a supply reel 14 past the guide rollers 16 and 18 to a wind up reel 20, suitable means being provided to effect rotation of the reels as indicated by the arrows thereon. Pursuant to a feature of the present invention, the playback apparatus 10 is provided with a pair of conventional playback or reproducing heads, or magnetic pick ups 22 and 24. Said reproducing heads are spaced from each other, along the path of tape travel, so that each recorded signal is reproduced first by pick up 22 and, after a predetermined time interval, depending upon the speed of travel of the tape and the distance which separates the two pick ups, the same signal is reproduced by the pick up 24. The output of the pick up 24 is applied through a pre-amplifier 25, to a voltage amplifier 26 which is preferably of the variable-mu type and functions as an automatic gain control, as hereinafter described in detail. The output of the pick up 22 is applied to a limiter or clipper 28. The limiter 28 may be of any suitable type known in the art, for example and not by way of limitation, the limiter 28 may be a parallel diode limiter which is arranged to pass only those signals applied thereto from the pick up 22, which are above a predetermined signal voltage or intensity level, or the limiter may be an amplifier biased to pass only signals above a predetermined voltage level, and in either case provision is made to adjust or vary the limiter to pre-set the minimum signal voltage level to be passed thereby. For example, referring now to the graphs of Fig. 2, Fig. 2A illustrates variations in signal voltage level per unit of tape 12, the latter being indicated in inches, as picked up by the playback heads 22 and 24 as the tape passes said heads. An arbitrarily predetermined maximum non-distortion signal voltage level is indicated at 31. It will be apparent that the variations in the signal voltage or intensity level, as indicated by the graph 30, are applied by the pick up 22 to the limiter 28 and by the pick up 24 to the amplifier 26 at different instants of time in view of the fact that the pick up head 22 is closer to the supply roll 14 than the pick up head 24. Assume now that the limiter circuit 28 is adjusted or pre-set so that it will pass only those signals having a voltage level above the predetermined maximum non-distortion signal voltage level 31. Consequently, it will be apparent that any signal of a voltage level at or below the level 31 is not passed by the limiter 28. The output of the limiter 28 is applied to a standard magnetic tape recording head 32, of the magnetic tape recorder and playback device 34.

Pursuant to a feature of the present invention, the device 34 is provided with a suitable base or support 36 which has a phonograph type of turn table or drum 38 and a suitable motor, not illustrated, rotates the drum in the direction of the arrow 42. The drum 38 is provided at its circumference with a continuous blank magnetic tape 40 which is rotated in the direction of the arrow 42 by the drum which constitutes the carrier for said magnetic tape 40. In addition to the magnetic recording head 32, the device 34 is provided with a conventional magnetic playback or pick up head 44, and with a conventional erasing head 46 for demagnetizing the tape 40 to erase recordings therefrom. While the recording head 32 is fixedly mounted on the base 36, the playback head 44 is mounted for adjustable movement circumferentially of the turn table or drum 38 and, in this connection, provision is made, as here shown, for a circular guide or track 48 along which the pick up or playback head 44 can be moved circumferentially of the drum 38, for example, as illustrated in the broken line position thereof. It will be understood that suitable provision is made to releasably secure the playback head 44 in any adjusted position thereof, and that said playback head 44 may be moved in either a clockwise or in a counter-clockwise direction, viewing Fig. 1. If desired, the magnetic erasing head 46 may also be mounted for movement along the track 48 so as to increase the range of movement of the playback head 44 in adjustably positioning the latter relative to the drum 38. The output of the pick up playback head 44 is amplified by the voltage amplifier 50 and is applied to a suitable rectifier circuit 52 which converts the output of the amplifier 50 to a D. C. voltage. Under certain conditions it may be desirable to retain the pulsations, for example, the audio frequency variations, in the output of the rectifier 52. Under such circumstances, the usual filter network may be eliminated from the rectifier. In this connection in order to provide for either a filtered or an unfiltered output at the rectifier 52, as desired, provision is made for a separate audio frequency filter 49 which can be cut in or cut out of the circuit between the rectifier 52 and the amplifier 26, as desired, by the switch 51. It will also be understood that the filter 49 may be a variable type filter to adjust the degree of filtration of the rectifier output, as may be desired. The D. C. voltage at the output of the rectifier 52 or filter 49, as the case may be, is applied as a bias voltage to the bias leads of the gain control amplifier 26.

Assuming now that the apparatus illustrated in Fig. 1 is in operation and that the tape 12 has a suitable audio recording thereon, and further that the tape 12 is moving between the playback heads 22 and 24 in synchronism with the movement of the tape 40 in the direction of the arrow 42, it will be apparent that each signal recorded on the tape 12 is applied through the playback head 22 to the limiter 28 and at a predetermined time delay or interval thereafter, the same signal is applied by the pick up head 24, in parallel with the pick up head 22, through the pre-amplifier 25 to the gain control amplifier 26. The limiter 28 is pre-set to pass to the recording head 32 only those signals which are at a voltage or intensity level which will result in distortion, namely those signals at a voltage level above the arbitrarily predetermined maximum non-distortion signal voltage level 31. Those signals above said level are recorded on the magnetic tape 40 and are reproduced or picked up by the playback head 44 for amplification by the voltage amplifier 50. The amplifier output is rectified in the rectifier 52 to provide correction or bias voltages which are representative of those signals which are above the predetermined maximum non-distortion signal voltage level 31. Consequently, it will be apparent that an increase in the signal voltage level above the level 31 will result in an increase in the bias voltage which is applied to the amplifier 26 for reducing the gain of the latter. As the distortion voltage level drops toward the level 31, the bias voltage applied to the amplifier 26 will decrease so as to increase the gain of the latter. It will be noted that during the period that the signal voltage level does not exceed the maximum non-distortion level 31, there will be no bias applied from the rectifier 52 to the gain control amplifier 26.

Further, said bias voltages may vary at the signal frequency, if the filter 49 is out of the circuit, or may have such frequency variations removed by the filter 49. As is well known to those skilled in the art, signals passing through a transmission system always encounter a certain amount of delay, and provision is made in the described apparatus to synchronize the application of the correction or bias voltages to the gain control amplifier with the arrival thereat of the corresponding signals. More specifically, the signals utilized to provide the bias or correction voltages are reproduced by the reproducing head 22 before the same signals are reproduced by the reproducing head 24 for transmission to the gain control amplifier. In addition, provision is made for an accurate and variable time delay or synchronizing adjustment in the network in circuit between the playback head 22 and the amplifier 26, through the adjustable playback head 44, as previously described. Consequently, if it is necessary to delay the time of application of the correction voltages or bias to coincide with the arrival of the corresponding signals at the amplifier 26 so as to apply said correction voltages at the very same instant that the corresponding signal is applied through the pick up head 24 to the gain control amplifier 26, the playback head 44 need only be moved in a clockwise direction, viewing Fig. 1, for example, as indicated by the broken line position thereof in said figure. A movement of the playback head 44 in the opposite or counter-clockwise direction will advance the time of application of the bias or correction voltages to the gain control amplifier 26. Consequently, it will be apparent that after the playback head 44 is initially adjusted, the time of arrival of the signal voltages and the correction bias voltages therefor, when necessary, at the gain control amplifier 26 will coincide. This is illustrated in the graph of Fig. 2B which illustrates the graph 33 of the bias or correction voltage applied to the gain control amplifier 26 per unit of time, as represented by the passage of the tape 12 between the playback heads 22 and 24 for the corresponding graph 30 of the variation in signal voltage level at the amplifier 26. It will be apparent from a comparison of graphs 30 and 33 that the correction voltage coincides with the distortion signal voltage level at the gain control amplifier 26 in a manner to increase the correction bias, or make the latter more negative, as the graph 30 rises above the predetermined maximum non-distortion voltage level 31 and to reduce the correction bias as the graph 30 approaches level 31. Fig. 2C illustrates a graph 35 of the resultant signal voltage level at the output of the gain control amplifier 26. It will be apparent that the graph 35 never exceeds the predetermined maximum non-distortion signal voltage level 31 whereby to eliminate all signal voltage levels above level 31. The corrected or non-distorted signal voltage level output 35 of the gain control amplifier 26 is applied to a standard power output amplifier 54. The power amplifier 54, in the case of a radio transmission system, would serve to modulate the radio transmitter in the usual manner to assure that signals at a maximum non-distorted signal level are being transmitted by the transmitter. For making the usual disk records, the output of the amplifier 54 could be applied to a master cutting head for making a record in which the signal voltage level never exceeds a predetermined maximum non-distortion signal voltage level and, similarly, the amplifier 54 could be used to operate the loud speaker in a public address system, or in a record playback system or reproducing system to provide for reproduction wherein the signal voltage level does not exceed the maximum non-distortion level.

It will be noted that the tape 40 can be used continuously since the signals recorded thereby are erased by the erasing head 46 before recorded tape portions reach the recording head 32.

Figure 3:
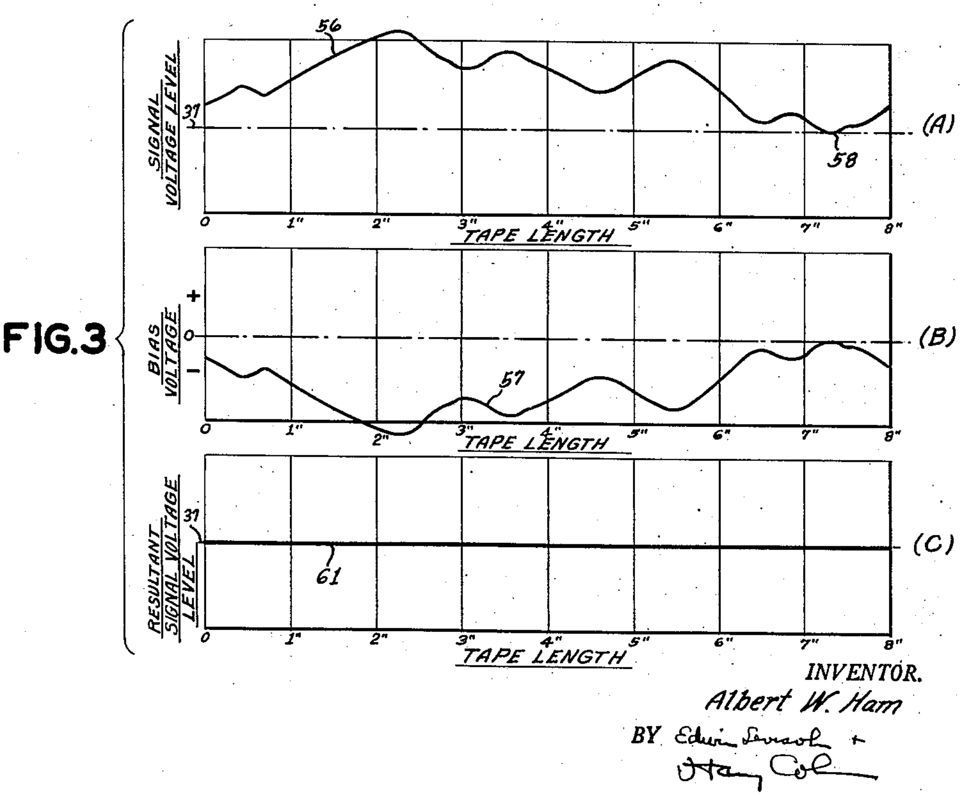
Fig. 3 illustrates graphs of voltage levels at various parts of said apparatus when operated to provide a constant non-distortion intensity or signal level.

In addition to its described use in maintaining signals at a predetermined maximum non-distortion signal voltage level, the apparatus of the present invention finds its most important use in providing a constant non-distortion signal voltage level. This is accomplished by merely changing the operating characteristics of the limiter. More specifically, in order to provide for recording, transmitting or reproducing at a constant signal voltage or intensity level, which will also serve to eliminate peak distortion levels, the predetermined maximum non-distortion signal voltage level 31 is set at the lowest signal voltage or intensity level of the recording or the lowest sound intensity level of the live source which is to be transmitted or reproduced, so that all signal voltage levels at which the signals will appear will be above said lowest level, as illustrated for example at 37 in Fig. 3A. In this connection, it will be noted that the graph of the signal voltage or intensity levels reproduced by the playback heads 22 and 24 is indicated at 56 and that the lowest signal voltage level of said graph appears at 58 and coincides with the predetermined desired constant signal voltage level 37, which may or may not coincide with the predetermined maximum non-distortion signal voltage level 31 in Fig. 2. Consequently, it will be apparent that under these conditions, the limiter 28 is pre-set or adjusted so that it will pass all signal levels above the level 37, which as indicated in graph 56, represents all signal levels originating with the live or recorded sound source, to provide bias voltage or correction voltage graph 57, as illustrated in Fig. 3B. It will be noted from the graph 61 of Fig. 3C that, under these conditions, the resultant signal output at the gain control amplifier 26 appears at the constant signal voltage level 37. Under these conditions, it will be apparent that, by using the power amplifier 54 to operate a master recording or cutting unit, the recording originally made on the tape 12 can be re-recorded at a constant non-distortion signal voltage or sound intensity level, or the power amplifier output can be transmitted through a radio transmitter at said constant level, or can operate the loud speaker of a public address or sound reproduction system at said constant level. In this connection, as is well known to those skilled in the art, the intelligibility range of a transmitter can be increased, without increasing the power output of the transmitter, by transmitting the intelligence containing signals at a constant signal level. The present invention provides a means for accomplishing this result where the intelligence is provided by an audio-frequency modulation of a carrier wave by providing modulation signals at a constant signal level.

Referring now to Fig. 4 in detail, there is illustrated a modification of the apparatus of Fig. 1 pursuant to which the magnetic recorder and playback means 34A is substituted for the magnetic tape recorder and playback means 34 of Fig. 1, all other components of the apparatus remaining the same as in Fig. 1 and having the same reference numerals. It will be noted that the magnetic tape recorder and playback device 34A is similar to the magnetic tape recorder device 10 being provided with a supply reel 14A and a take-up reel 20A for the blank magnetic tape 40A. Provision is made for a fixed magnetic recording head 32A which is energized by the output of the limiter 28 and for a magnetic playback head 44A which is adjustably mounted for adjustable disposition, as indicated by the arrows 60. The tape 40A as it comes from the supply reel 14A is blank unmagnetized tape and as it passes the recording head 32A, records the output of the limiter 28, in the same manner as the tape 40 in Fig. 1. The playback head 44A is suitably mounted on the track or guideway 48A for adjustment in the directions of the arrow 60, to perform the function of the previously described playback head 44 so as to assure that the correction or bias voltages are applied to the gain control amplifier 26 in synchronism or concomitantly with the arrival of a corresponding signal at the amplifier 26. In this connection, it will be understood that the tape 40A moves at the same speed between the supply reel 14A and the take-up reel 20A, as the speed of movement of the tape 12 in moving from the supply reel 14 to the take-up reel 20. Further in this connection, it will be understood that the playback head 44A may be spaced initially from the recording head 32A substantially the same distance as the spacing between the heads 22 and 24, and, thereafter, said head 44A may be adjusted as required, in the direction of the arrows 60 to adjust for any time delay in the transmission network between the playback head 22 and the amplifier 26.

Figures 5, 6:
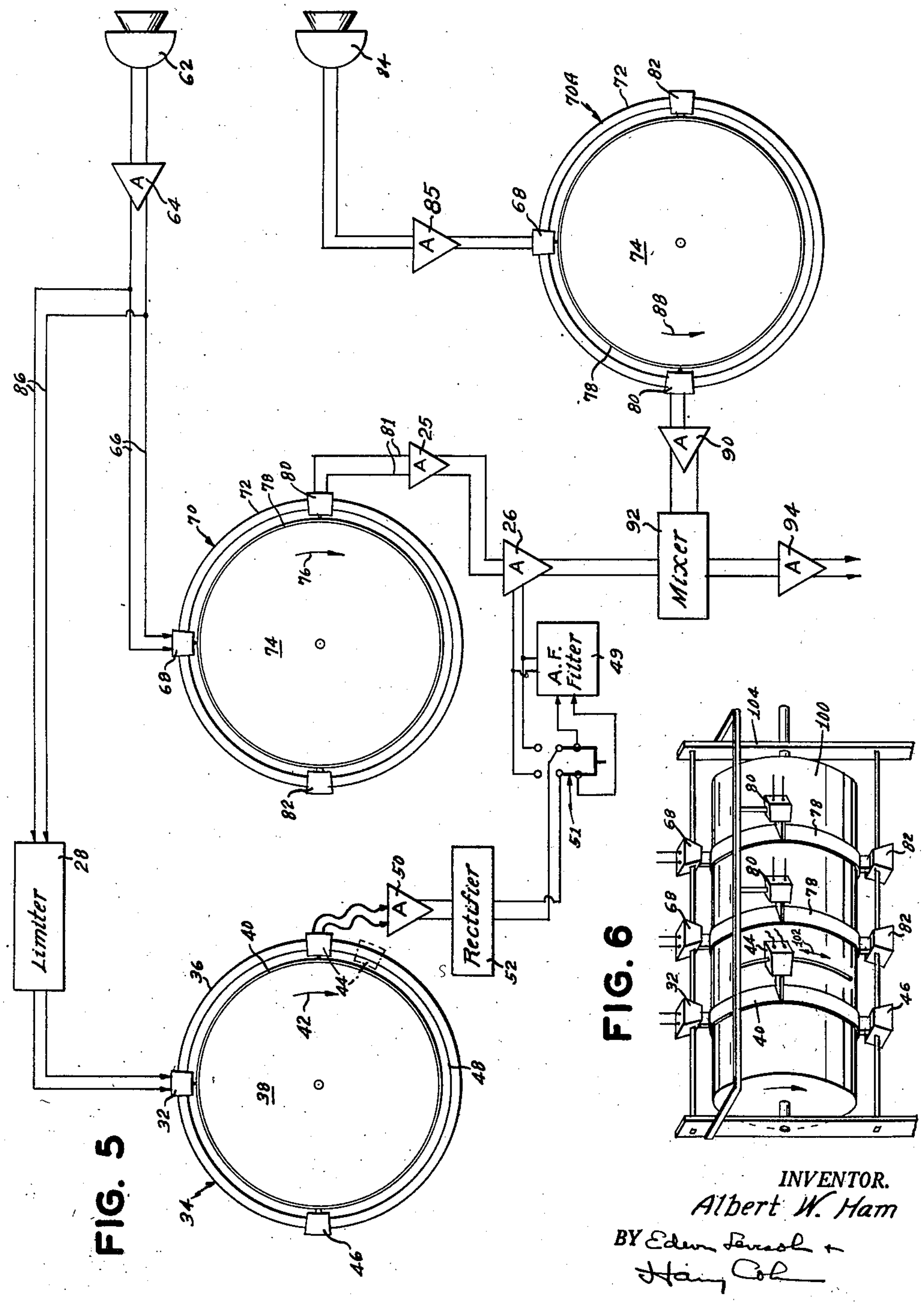
Fig. 5 illustrates another embodiment of the present invention.
Fig. 6 illustrates a modification in the apparatus of Fig. 5.

Referring now to Fig. 5 of the drawings in detail, there is shown an embodiment wherein the original input to the apparatus of the present invention is from a live source rather than from a recording as in Figs. 1 and 4. Pursuant to the present embodiment, a microphone 62 has its output connected to an audio amplifier 64. The output of the amplifier 64 is applied through the leads 66 to a magnetic recording head 68 on the magnetic recording apparatus 70. The apparatus 70 is substantially the same as the previously described apparatus 34 of Fig. 1 being provided with a base 72 which mounts a turn table or drum 74 for rotation in the direction of the arrow 76. A continuous or endless magnetic tape 78 is secured to the circumferential periphery of the turn table or drum. A magnetic playback head is indicated at 80 and a magnetic erasing or demagnetizing head is indicated at 82. The magnetic head 80 is fixed in position a predetermined distance from the recording head 68 and the output of the pick up head is applied through the leads 81 to the pre-amplifier 25 and from the latter to the gain control amplifier 26 which is similar to the previously described gain control amplifier 26. The output of the amplifier 64 is also applied through the leads 86, in parallel with the leads 66, to a limiter 28, and the output of the limiter is applied to a recording head 32 of the recording apparatus 34, all as in Fig. 1. As previously described, the recording apparatus 34 is provided with the support 36 which mounts the turn tabe 38 for rotation in the direction of the arrow 42. The turn table is provided with the endless magnetic tape 40 at the periphery thereof and provision is made for the adjustable playback head 44 and for the erasing or demagnetizing head 46. The playback head 44 is adjustably mounted on the track or guideway 48. As in the prior embodiment of Fig. 1, the output of the playback head 44 is applied to an amplifier 50 and from the latter to a rectifier 52, provision being made for the switch 51 and the filter 49. As previously described, the limiter 28 in the present embodiment operates to pass only those signals above a predetermined signal voltage or intensity level for providing correction or bias voltages at the output of the rectifier 52 which serves to bias the gain control amplifier 26. The turn tables or drums 38 and 74 operate at the same speed and it will be noted that all signal voltages at the output of the microphone 62 are delayed or stored for a predetermined time in the recording apparatus 70 and said delay or storage time depends upon the speed of rotation of the drum 74 and the distance between the recording head 68 and the playback head 80. In order to provide for the correction or bias voltages being applied to the gain control amplifier 26 in synchronism with the very same signal voltages from which said correction or bias voltages originate, the playback head 44 in the recording apparatus 34 is adjustable relative to the fixed recording head 32, as previously described in connection with Fig. 1. Consequently, it will be apparent that the signals at the output of the gain control amplifier 26 may be compensated or corrected for peak signal voltage level distortion, as illustrated and described in connection with the graphs of Fig. 2, and in addition the limiter 28 may be set or adjusted, as previously described, at a predetermined signal voltage level so as to provide for a constant signal voltage level output at the gain control amplifier 26, as in Fig. 3C. Therefore, it will be apparent that with a performer singing into the microphone 62 the output of the gain control amplifier 26 will, in the latter setting of the limiter, provide a constant non-distortion signal voltage level. The present arrangement is such that provision is made for an additional microphone 84 for recording the musical background for the singer. The output of the microphone 84 is applied to a suitable audio frequency amplifier 85 from which it is applied to a second recording apparatus 70A which is provided with a magnetic recording head 68 monted on a suitable support 72 which also mounts the drum or turn table 74 for rotation in the direction of the arrow 88. The drum 74 is provided at its circumferential periphery with a continuous or endless magnetic tape 78. Provision is also made in the apparatus 70A for the magnetic playback head 80 and for the magnetic erasing or demagnetizing head 82. Consequently, it will be apparent that the musical background is being recorded by the magnetic recording apparatus 70A through the magnetic recording head 68 thereof and is being applied to the magnetic playback head 80 thereof to a suitable audio frequency amplifier 90. From the amplifier 90, the signal voltages representative of the musical background are applied to a mixer 92 which may be of any suitable type well known in the art, for example and not by way of limitation, said mixer may be of the type illustrated and described on pages 194 and 195 of Fundamentals of Radio, by W. L. Everitt, published in 1942 by Prentice-Hall, Inc.

The constant signal level output of the amplifier 26 is also applied to the mixer 92 so as to combine the voice and music signals which are then applied to a suitable power amplifier 94. The output of the amplifier 94 may be used to modulate a suitable transmitter, as for a radio broadcast, or the output of the amplifier 94 may be applied to a master cutting unit for making a master record. In addition, the output of the amplifier 94 may be applied to a suitable public address system. It will be understood that the three turn tables or drums illustrated in Fig. 5 all rotate at the same speed.

While three separate drums are illustrated in Fig. 5, provision may be made for only a single drum 100, as in Fig. 6. The drum 100 is rotated by a suitable motor, not shown, and, as here shown is provided with the three tapes of the previously described devices 34, 70 and 70A. A recording head, a playback head and an erasing head is provided for each tape, said heads having the same reference numerals as in Fig. 5. In addition, the head 44 is mounted for adjustable movement as indicated by the arrow 102. A frame 104 mounts the various heads in operative disposition, as illustrated.

It is within the scope of the present invention, to provide for the elimination of peak signal level distortion in recording the musical background, as well as for recording the musical background at a constant signal voltage level, which preferably would be at a level below the level at which the voice is being recorded. In such a construction, the output of the microphone 84 would be applied to two separate recording units 34 and 70, the unit 34 being preceded by a limiter 28, in the same arrangement in which the voice recording is made in the embodiment of Figure 5. In such a construction, the mixer 92 would receive a constant signal level non-distortion output from each of the microphones 62 and 84. In addition, it is within the scope of the present invention, to use a series of microphones, in the well known manner, for recording the musical background. For example, one microphone might be used solely for the string instruments, another microphone might be used solely for the wind instruments, or a separate microphone might be used for the rhythm section of the orchestra. In each case, the outputs of the various microphones for the orchestra would be applied to a separate recording apparatus 70A and the output of each apparatus would be fed to the mixer 92. This would be the situation where the orchestral background is not being compensated for peak level distortion or is not being recorded at a constant signal level. Where the latter are desired, the output of each microphone for the orchestral outputs would be applied to two separate recording apparatuses 34 and 70, as in Fig. 5, and the corrected output, which would be at a non-distorted constant signal level would be applied to the mixer 92 in the same manner as is done with the voice output.

Referring now to Fig. 7 in detail, there is illustrated a presently preferred embodiment which utilizes a magnetic tape recording as the signal source, as in Figs. 1 and 4. Pursuant to the present embodiment the necessity for the magnetic recording and playback device 34 or 34A, as in Figs. 1 and 4, respectively, is obviated. Provision is made for the conventional magnetic tape playback apparatus 10A, as in the embodiments of Figs. 1 and 4, in which the magnetic tape 12, which has a suitable full track sound recording 105 thereon, travels from the supply reel 14 past the guide rollers 16 and 18 to a wind up reel 20, suitable means being provided to effect the rotation of the reels as indicated by the arrows thereon. The playback apparatus 10A is provided with a pair of conventional half track playback or reproducing heads, or magnetic pick-ups 106 and 108. Pursuant to a feature of the present invention, the half track reproducing head 108 is mounted, as by the track 110, for adjustable movement along the path of travel of the tape 12, as indicated by the arrows 114, suitable provision being made to releasably secure said head 108 in adjusted position theerof. Signal voltages reproduced by the pick-up 108 are transmitted to the pre-amplifier 25 and from the latter to the gain control amplifier 26, as described with reference to Figs. 1 and 4. Signal voltages reproduced by the pick-up 106 are applied to the limiter 28. As in each of the previously described embodiments, the limiter 28 may be of any known type which is suitable to pass only those signal voltages above a predetermined intensity or voltage level and said limiter has conventional provision to vary or adjust said predetermined level. The limiter output is applied directly to the voltage amplifier 50 and from the latter to the rectifier 52 to provide a correction or bias voltage, which is applied to the bias leads of the gain control amplifier 26 as a bias or correction voltage, as previously described. Provision is also made for the previously described audio frequency filter 49 and switch 51 so that the rectifier output may be filtered, or left unfiltered, as desired.

As is well known to those skilled in the art, each of the half track reproducing heads 106 and 108 faithfully reproduces the full track recording 105 on the tape 12 so that all signals which are recorded on the tape are applied through parallel transmission systems to the gain control amplifier 26. One of said transmission systems includes the half track pick-up 108 and the pre-amplifier 25. The other transmission system includes the half track pick-up 106, the limiter 28, the amplifier 50, the rectifier 52, and the filter 49, where the latter is switched into the circuit. Due to the greater inherent delay time of the latter transmission system, as compared with the transmission delay between the pick-up head 108 and the gain control amplifier 26, said pick-up head 108 is mounted for adjustment along the path of tape travel, as described. Consequently, with the same initial setting of the pick-up heads 106 and 108 relative to the supply reel 14, it will be apparent that the adjusted movement of the pick-up head 108 in a direction away from the supply reel 14 and toward the take up reel 20 will result in an adjusted reproducing position for the pick-up 108 which will compensate for the greater time delay in the transmission system of the pick-up head 106. More specifically, the pick-up 108 will reproduce each recorded signal at a predetermined time interval after the reproduction thereof by the pick-up 106 so as to synchronize the time of application or arrival of each signal voltage at the gain control amplifier 26, from the pick-up 108, with the time of application at said gain control amplifier of the corresponding bias voltage for those signals which are also passed by the limiter 28. Therefore, it will be apparent that the provision of two half track pick-ups, one of which is adjustable, constitutes means for compensating for inherent transmission delay in the respective transmission systems of said pick-ups whereby to synchronize the outputs of said transmission systems. As previouly described, the limiter 28 may be pre-set at a predetermined level to eliminate peak signal level distortion or said limiter may be pre-set to provide a predetermined constant signal level output at the gain control amplifier 26. The output of the amplifier 26 is applied to the power amplifier 54, as previously described, for reproducing or transmitting the recording 105, or for making a master recording thereof.

It will also be apparent that it is within the scope of the present invention to mount the pick-up 106 for adjustable movement in the direction of the arrows 114 and to have the pick-up 108 fixed in position. In the latter case, the described compensation can be secured by initially setting both pick-ups in the same position along the path of travel of the tape 12 and then moving pick-up 106 closer to the supply reel 14, as required, to provide for said delay compensation.

As previously described in connection with the embodiments of Figs. 1, 4, 5 and 7, there is a voltage preamplifier 25 provided in the signal input transmission system for the gain control amplifier 26 and there is a voltage amplifier 50 provided in the correction voltage or bias voltage transmission system for the gain control amplifier. It will be understood that the gain of each of the amplifiers 25 and 50 is pre-set or established to assure the same amplification for the bias or correction voltages as for their corresponding signal voltages.

Despite the fact that in the described embodiments, the sound is being recorded or transmitted at a constant level, the various sound characteristics are retained by the apparatus of the present invention. Since the wave form or wave shape of the sound waves are substantially not altered by the apparatus of the present invention, it being noted that the apparatus affects only the signal level or intensity, the quality or timbre of the sound waves are not affected even though recorded or transmitted at a constant signal level. Similarly, since the frequency of the sound waves is substantially not affected, the pitch of the original sound is not altered. With reference to the loudness of the original sound, loudness, as is well known to those skilled in the art, is a function of the intensity of the sound and is also dependent upon the wave form composition and the frequency thereof. The apparatus of the present invention retains those aspects of loudness which are concerned with wave form composition and with frequency, as in the original live source of sound or in the original recording. Therefore, the effect or quality of loudness present in the original sound is also substantially retained by the present apparatus.

While the present invention has been described in connection with the recording and transmission of signals within the audio frequency range, it is not limited thereto and it is within the scope of the present invention to similarly record and transmit signals of higher frequency, for example and not by way of limitation, television picture signals may be recorded and transmitted by the apparatus of the present invention.

As previously explained, the recording devices 34 in Figs. 1 and 5, as well as the recording device 34A in Fig. 4, provide for a recording of a signal and for a reproduction thereof at a predetermined time interval or delay after the recording thereof, said time interval being adjustable through the medium of the adjustable playback head 44 or 44A, as the case may be. Consequently, it will be apparent that such a recording device is not limited for use in, or with, the apparatus of the present invention for recording and transmitting signals at a constant signal level. In this connection, it will be understood that the use of the adjustable reproducing head to provide for a desired time delay between the reception and transmission of a signal voltage can be used wherever it is desired to store or delay a signal voltage for a predetermined period. In this connection, it will be apparent that a signal voltage of any desired type may be applied to the magnetic recording head 32 or 32A, as the case may be, and recorded on the moving magnetic tape. The signal may then be stored on the tape for a predetermined storage or delay period and when said signal is desired for a particular use, it is applied to the playback head 44 or 44A, as the case may be, for reproduction. By controlling the speed of movement of the tape between the recording and reproducing heads, and by adjusting the distance between said heads, as required, it being noted that said adjustment is a variable adjustment, as previously described, the signal which is originally recorded on the tape may be stored or delayed for a predetermined period of time and reproduced from the tape when required for a particular purpose of function. Said signal may then be erased by the erasing head 46 and the tape is again available for the same function.

While I have shown and described the preferred embodiments of my invention, it will be understood that various changes may be made in the idea or principles of the invention within the scope of the appended claims.

Having thus described my invention, what I claim and desire to secure by Letters Patent is:

1. In apparatus of the character described, limiter means, gain control amplifier means, means to apply in parallel to said limiter means and to said gain control means the signals from a common source, said limiter means being operable to pass only those signals having an intensity above a predetermined signal level, means to rectify those signals transmitted by said limiter means to provide bias voltages for said gain control means proportional to the signal levels of said transmitted signals, and means to synchronize the application to said gain control means of said bias voltages with the arrival thereat of the corresponding signals from said source which are utilized to provide the respective bias voltages, said synchronizing means comprising means for delaying the transmission of the signals from said common source to said gain control amplifier means and delay means operable in the circuit which includes said limiter means and said rectifier means to compensate for the signal transmission delay of said circuit, the delay means in said circuit being adjustable for substantially equalizing the transmission delay of said circuit with the signal transmission delay to said gain control amplifier, said delay means in said circuit comprising a recording head, a reproducing head spaced from said recording head and means for moving a recording medium in a direction from said recording head to said reproducing head, whereby said recording head is operable to record the voltages in said circuit on said medium and said reproducing head is operable to reproduce the recorded voltages after a time delay predetermined by the spacing between said heads and the speed of travel of the medium, and means to adjustably vary the relative spacing of said heads for adjustably varying said time delay.

2. In apparatus of the character described, limiter means, gain control amplifier means, means to apply in parallel to said limiter means and to said gain control means the signals from a common source, said limiter means being operable to pass only those signals having an intensity above a predetermined signal level, means to rectify those signals transmitted by said limiter means to provide bias voltages for said gain control means proportional to the signal levels of said transmitter signals, and means to synchronize the application to said gain control means of said bias voltages with the arrival thereat of the corresponding signals from said source which are utilized to provide the respective bias voltages, said synchronizing means comprising means for delaying the transmission of the signals from said common source to said gain control amplifier means and delay means operable in the circuit which includes said limiter means and said rectifier means to compensate for the signal transmission delay of said circuit, the delay means in said circuit being adjustable for substantially equalizing the transmission delay of said circuit with the signal transmission delay to said gain control amplifier, said delay means in said circuit comprising a magnetic recording and playback device having rotary drum means, an endless magnetic tape carried by said drum, a magnetic recording head operable to record the voltages in said circuit on said tape, a magnetic reproducing head spaced from said recording head in the direction of rotation of said drum for reproducing the recorded voltages, a magnetic erasing head interposed between said recording and reproducing heads for demagnetizing the tape after it passes said reproducing head, and means for adjustably positioning said reproducing head relative to said recording head for adjustably varying said time delay.

3. In apparatus of the character described, limiter means, gain control, amplifier means, means to apply in parallel to said limiter means and to said gain control means the signals from a common source, said limiter means being operable to pass only those signals having an intensity above a predetermined signal level, means to rectify those signals transmitted by said limiter means to provide bias voltages for said gain control means proportional to the signal levels of said transmitted signals, and means to synchronize the application to said gain control means of said bias voltages with the arrival thereat of the corresponding signals from said source which are utilized to provide the respective bias voltages, said synchronizing means comprising means for delaying the transmission of the signals from said common source to said gain control amplifier means and delay means operable in the circuit which includes said limiter means and said rectifier means to compensate for the signal transmission delay of said circuit, the delay means in said circuit being adjustable for substantially equalizing the transmission delay of said circuit with the signal transmission delay to said gain control amplifier, said delay means in said circuit comprising a magnetic recording and playback device having means for moving a magnetic tape from a supply reel to a take-up reel, a magnetic recording head and a magnetic reproducing head spaced from each other along the path of travel of the tape between said reels, said recording head being closer to said supply reel, whereby said recording head is operable to record the voltages in said circuit on said medium and said reproducing head is operable to reproduce the recorded voltages after a time delay predetermined by the spacing between said heads and the speed of travel of the medium, and means to adjustably vary the relative spacing of said heads for adjustably varying said time delay.

4. In apparatus of the character described magnetic reproducing means having a pair of reproducing heads spaced from each other so that with a magnetic tape recording travelling between said heads one of said heads will reproduce recorded signals a predetermined time interval after said signals are reproduced by the other head, gain control amplifier means in circuit with said one reproducing head, limiter means in circuit with said other reproducing head and operable to pass voltages above a predetermined signal voltage level, a magnetic recording and reproducing device having a recording head in circuit with the output of said limiter for recording on a magnetic tape the signal voltages transmitted thereby, a reproducing head spaced from said recording head to reproduce after a predetermined time interval the signals recorded by said latter tape, rectifier means in circuit between said latter reproducing head and said gain control amplifier means to provide the latter with bias voltages proportional to the levels of said limiter transmitted signal voltages, and means for variably adjusting the spacing between the reproducing and recording heads of said device to synchronize the application to said gain control means of said bias voltages with the arrival thereat of the corresponding signals from said one reproducing head which are reproduced earlier by said other reproducing head to provide said bias voltages.

5. Apparatus as defined in claim 4, further characterized in that said magnetic recording and reproducing device is provided with a rotary drum having an endless magnetic tape thereon, and a magnetic erasing head is interposed between the heads of said device for demagnetizing the endless tape after it passes the reproducing head of said device.

6. Apparatus as defined in claim 4, further characterized in that said magnetic recording and reproducing device is provided with means for moving a magnetic tape from a supply reel to a take-up reel, the recording and reproducing heads of said device being spaced along the path of travel of said latter tape with the recording head closer to said supply reel.

7. In apparatus of the character described a pair of recording and reproducing devices each provided with a recording head and with a reproducing head spaced from the associated recording head for the travel of a recording medium from each recording head to its associated reproducing head, said recording heads being connected in parallel with a signal voltage source, limiter means in circuit between the recording head of one of said devices and said source, said limiter means being operable to pass only those signals having an intensity above a predetermined signal level for recording by said one device, a gain control amplifier in circuit with the reproducing head of said other device, a rectifier in circuit with the reproducing head of said one device to provide bias voltages to said gain control means proportional to the signal levels of said limiter transmitted signals, and means to variably adjust the spacing between one of said reproducing heads and its associated recording head to synchronize the application to said gain control means of said bias voltages with the arrival thereat of the corresponding signals from the reproducing head of said other device.

8. In apparatus of the character described a pair of recording and reproducing devices each provided with a recording head and with a reproducing head spaced from the associated recording head for the travel of a recording medium from each recording head to its associated reproducing head, said recording heads being connected in parallel with a signal voltage source, limiter means in circuit between the recording head of one of said devices and said source, said limiter means being operable to pass only those signals having an intensity above a predetermined signal level for recording by said one device, a gain control amplifier in circuit with the reproducing head of said other device, a rectifier in circuit with the reproducing head of said one device to provide bias voltages to said gain control means proportional to the signal levels of said limiter transmitted signals, and means to variably adjust the spacing between one of said reproducing heads and its associated recording head to synchronize the application to said gain control means of said bias voltages with the arrival thereat of the corresponding signals from the reproducing head of said other device, a mixer connected to the output of said gain control amplifier means, and an additional recording and reproducing device provided with a recording head and with a reproducing head spaced therefrom for the travel of a recording medium from the recording head to the reproducing head of said additional device, said latter recording head being in circuit with an additional signal voltage source and said latter reproducing head being in circuit with said mixer.

9. Apparatus as defined in claim 7, further characterized in the provision of an additional pair of recording and reproducing devices each provided with a recording head and with a reproducing head spaced from the associated recording head for the travel of a recording medium from each of said additional recording heads to its associated reproducing head, said additional recording heads being connected in parallel with an additional signal voltage source, additional limiter means in circuit between the recording head of one of said additional devices and said additional source, said latter limiter means being operable to pass from said additional source only those signals having an intensity above a predetermined signal level for recording by said one additional device, an additional gain control amplifier in circuit with the reproducing head of said other additional device, an additional rectifier in circuit with the reproducing head of said one additional device to provide bias voltages to said additional gain control means proportional to the signal levels of said additional limiter transmitted signals, means to variably adjust the spacing between one of said additional reproducing heads and its associated recording head to synchronize the application to said additional gain control means of said latter bias voltages with the arrival thereat of the corresponding signals from the reproducing head of said other additional device, and a mixer in circuit with the outputs of both of said gain control amplifier means.

References Cited in the file of this patent

UNITED STATES PATENTS

| | | |
|---|---|---|
| 1,931,866 | Heising | Oct. 24, 1933 |
| 2,052,110 | Pfister | Aug. 25, 1936 |
| 2,077,466 | Dreyer | Apr. 20, 1937 |
| 2,101,549 | Lamb | Dec. 7, 1937 |
| 2,748,192 | Goodfriend | May 29, 1956 |